United States Patent [19]

Worley et al.

[11] Patent Number: 4,659,484

[45] Date of Patent: Apr. 21, 1987

[54] METHOD FOR TREATING AIR-COOLING SYSTEM'S AQUEOUS MEDIUM

[75] Inventors: Shelby D. Worley; Larry J. Swango, both of Auburn, Ala.

[73] Assignee: PPG Industries, Inc., Pittsburgh, Pa.

[21] Appl. No.: 866,680

[22] Filed: May 27, 1986

[51] Int. Cl.$^4$ ............................................. C02F 1/50
[52] U.S. Cl. ................................. 210/755; 210/764; 210/765; 134/22.11; 422/37
[58] Field of Search ....................... 210/764, 765, 755; 162/161; 514/376; 134/22.11, 42; 422/37

[56] References Cited

U.S. PATENT DOCUMENTS

| | | | |
|---|---|---|---|
| 3,591,601 | 7/1971 | Walles | 260/307 |
| 3,931,213 | 1/1976 | Kaminski et al. | 260/307 |
| 4,000,293 | 12/1976 | Kaminski et al. | 424/272 |
| 4,009,178 | 2/1977 | Bodor et al. | 260/307 C |
| 4,468,332 | 8/1984 | Peacock et al. | 210/764 |

OTHER PUBLICATIONS

"A Novel Chloramine Compound for Water Disinfection", H. D. Burkett et al., Water Resources Bulletin, vol. 17, No. 5, pp. 874–879.

"Potential New Water Disinfectants", S. D. Worley et al., Water Chlorination; Environmental Impact and Health Effects, vol. 5, Ch. 98, R. L. Jolley, Ed. (1985).

"Comparisons of a New N-Chloramine Compound with Free Chlorine as Disinfectants for Water", S. D. Worley et al., Progress in Chemical Disinfection.

"New Antimicrobial Agents for Treatment of Water", S. D. Worley et al., NTIS Report W 055507 (PB82-168535).

*Primary Examiner*—Benoit Castel
*Attorney, Agent, or Firm*—Irwin M. Stein

[57] ABSTRACT

Recirculating water used in closed cycle air-conditioning systems is treated with a 3-chloro-2-oxazolidinone derivative, e.g., 3-chloro-4,4-di($C_1$–$C_4$)alkyl-2-oxazolidinones such as 3-chloro-4,4-di-methyl-2-oxazolidinone, to prevent the growth of *Legionella pneumophila* therein.

16 Claims, No Drawings

METHOD FOR TREATING AIR-COOLING SYSTEM'S AQUEOUS MEDIUM

DESCRIPTION OF THE INVENTION

The Government of the United States retains a nonexclusive, paid-up license to practice or have practiced for it the invention described herein for governmental purposes.

The present invention relates to the use of 3-chloro-2-oxazolidinone derivatives for the control and disinfection of halogen-sensitive microorganisms, particularly *Legionella pneumophila,* in air-cooling systems. More particularly, the present invention relates to the use of 3-chloro-4,4-substituted-2-oxazolidinones, especially, 3-chloro-4,4-di-($C_1$-$C_4$)alkyl-2-oxazolidinones, for treatment of recirculating water in air-cooling systems to inhibit or control the growth of such microorganisms, or to disinfect such water.

The use of central air-cooling systems for office buildings, hotels, convention centers, hospitals, and apartment buildings is common. Many of such air-cooling systems utilize water to cool refrigerant condensers used to cool the circulating air. Such cooling water is generally recirculated due to the increased demand for limited supplies of treated water and because it has become economically attractive to do so.

Recirculating water in a typical central air-cooling system is an ideal environment for the growth of microorganisms of many types. Accordingly, the water is typically treated chemically, e.g., with chlorinating and other chemical disinfection agents, to prevent the growth of biofouling organisms and other microorganisms. Many of the chemicals used in such treatments are corrosive to materials of construction commonly used in the air-cooling system. Further, the effective period of disinfection of many of such chemicals, e.g., chlorine, is relatively short, thereby requiring frequent chemical treatments, which not only adds to the cost but also exacerbates the corrosion problem within the air-cooling system.

Growth of the pathogen *Legionella pneumophila* in the recirculating aqueous medium of air-cooling, e.g., closed cycle air-conditioning systems has been documented. The leaking of such a contaminated aqueous medium to the air circulating ducts of the air-cooling system has resulted in the loss of human life. It would be desirable therefore, to utilize in such air-cooling systems a disinfectant that is effective against *Legionella pneumophila,* is relatively long lasting, and is relatively non-corrosive.

DETAILED DESCRIPTION OF THE INVENTION

It has now been discovered that certain 3-chloro-2-oxazolidinone derivatives, e.g., 3-chloro-4,4-di($C_1$-$C_4$)alkyl-2-oxazolidinones, particularly 3-chloro-4,4-dimethyl-2-oxazolidinone, may be used to treat the recirculating aqueous medium in an air-cooling system to inhibit or prevent the contamination of such aqueous medium with *Legionella pneumophila.* More particularly, the present invention is directed to the treatment of aqueous media contaminated with *Legionella pneumophila* with such 3-chloro-2-oxazolidinones to disinfect same and provide a continuous reserve of bactericide to prevent the growth and spread of such organism. The 2-oxazolidinones described herein are relatively stable in aqueous solution under the conditions, e.g., temperature, pH, etc., generally existing in a closed cycle recirculating aqueous medium utilized in central air-conditioning units. Frequent replenishment of the 2-oxazolidinone is, therefore, not required. Further, the 2-oxazolidinones are less corrosive to materials of construction used in air-cooling systems, e.g., metal pipes and coils, cloth filters, wooden slats, etc., than is free chlorine, such as that provided by elemental chlorine or compounds which produce chlorine in the form of, for example, hypochlorite ion, such as calcium hypochlorite.

The 3-chloro-2-oxazolidinones described herein may be prepared by chlorination of the corresponding unhalogenated 2-oxazolidinone. Chlorination may be carried out with elemental chlorine in an aqueous medium at temperatures in the range of from 0° C. to 10° C. Alternatively, halogenation may be performed with an organic chlorinating reagent, such as trichloroisocyanuric acid, in an aqueous medium or a mixture of water and an inert organic solvent, such as chloroform, methylene chloride or ethylene chloride. Chlorination with an organic chlorinating agent may be conducted at ambient temperatures. Unhalogenated 2-oxazolidinones may be prepared by reaction of a corresponding alkanolamine with a di(lower alkyl)carbonate such as diethylcarbonate in the presence of a strong base such as an alkali metal alkoxide, e.g., sodium methoxide, or with gaseous phosgene.

U.S. Pat. Nos. 4,000,293 and 3,931,213 describe the preparation of 3-chloro-2-oxazolidinones and further describes their use as bactericides. Moreover, the efficacy of 3-chloro-4,4-dimethyl-2-oxazolidinone for water disinfection has been described in a number of publications, such as, "A Novel Chloramine Compound for Water Disinfection" by H. D. Burkett et al, Water Resources Bulletin, Vol. 17, No. 5, pages 874–879, October 1981; "Potential New Water Disinfectants" by S. W. Worley et al., Water Chlorination: Environmental Impact and Health Effects, Vol. 5, Chapter 98, R. L. Jolley, Ed. (1985); "Comparisons of a New N-Chloramine Compound with Free Chlorine as Disinfectants for Water", by S. D. Worley et al., Progress in Chemical Disinfection, Proceedings of the Second Biannual Conference, pp. 45–60 (1984); and "New Antimicrobial Agents For Treatment of Water" by S. D. Worley et al, NTIS, Report W 055507 (PB82-168535). These publications, however, do not address the efficacy of 3-chloro-4,4-dimethyl-2-oxazolidinone against *Legionella pneumophila* or its use for the treatment of recirculating water used in air-cooling systems.

The 2-oxazolidinones that may be used in the present process can be represented by the following graphic formula I, 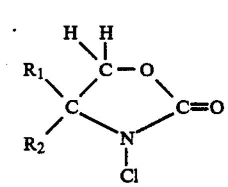 (I)

wherein $R_1$ is $C_1$–$C_4$ alkyl, such as methyl, ethyl, propyl, isopropyl, butyl, isobutyl and secondary butyl, and $R_2$ is selected from the group $R_1$, i.e., $C_1$–$C_4$ alkyl, hydroxy, hydroxymethyl, $C_1$–$C_4$ alkoxy, such as methoxy, ethoxy, propoxy, isopropoxy and butoxy, e.g., n- butoxy, isobutoxy and secondary butoxy, and substituted phenyl (—Ph—R), particularly para-substituted phenyl, wherein Ph is bivalent substitute phenyl (phenylene) and said phenyl substituents, R, are each selected from the group consisting of $C_1$–$C_4$ alkyl, $C_1$–$C_4$ alkoxy and hydroxy. Preferably, $R_1$ and $R_2$ are a $C_1$–$C_4$ alkyl and, more preferably, are selected from the group consisting of methyl and ethyl. Preferably, $R_1$ and $R_2$ are the same, and still more preferably are methyl.

Examples of suitable 2-oxazolidinones that may be used in the present method include: 3-chloro-4,4-dimethyl-2-oxazolidinone, 3-chloro-4,4-diethyl-2-oxazolidinone, 3-chloro-4-methyl-4-ethyl-2-oxazolidinone, 3-chloro-4-methyl-4-hydroxy-2-oxazolidinone, 3-chloro-4-methyl-4-methoxy-2-oxazolidinone, 3-chloro-4-methyl-4-hydroxymethyl-2-oxazolidinone, and 3-chloro-4-methyl-4-p-methylphenyl-2-oxazolidinone. By substitution of other $R_1$ and $R_2$ named substituents at the 4-position of the 3-chloro-2-oxazolidinone for the specifically enumerated substituents listed hereinbefore, other analogous oxazolidinone derivatives may be named. The preferred 2-oxazolidinone is 3-chloro-4,4-dimethyl-2-oxazolidinone.

The amount of the aforesaid 2-oxazolidinone bactericide added to the recirculating aqueous medium should be an amount that is sufficient to disinfect the water of undesired halogen-sensitive microorganisms, e.g., bacterial, fungi, viruses and protozoa. Such amount may be characterized as a biocidally effective amount of the 2-oxazolidinone. In terms of specific microorganisms, such amounts may be expressed as bactericidal, fungicidal, virucidal or protozoacidal amounts. More particularly, sufficient of the 2-oxazolidinone biocide should be used to establish within the aqueous medium a concentration of from about 0.3 to about 20 parts per million of potential positive chlorine provided by the 2-oxazolidinone compound. More typically, sufficient of the compound is used to establish between about 0.5 and about 5, e.g., between about 1 and about 3, parts per million of potential positive chlorine. Such amounts are deemed to be sufficient to prevent the growth of pathogens, such as Legionella pneumophila, and other bacteria in the recirculating aqueous medium, and the subsequent spread of such bacteria outside the immediate environment of the air-cooling system.

In addition to adding the aforedescribed 2-oxazolidinones to the recirculating aqueous medium of the air-cooling system, it is also contemplated that the described 2-oxazolidinones may be used as an additive to a biologically-active composition, e.g., a disinfecting, germicidal, sanitizing or other biocidal application for treatment of solid surfaces contaminated with Legionella pneumophila. Such compositions may take the form of liquid or solid formulations, including formulations in the physical state of finely-divided powders and granular materials, liquids such as solutions, concentrates, emulsifiable concentrates, slurries and the like. The 2-oxazolidinones may be used alone or in combination with other known biologically-active materials, such as other bactericides, fungicides, virucides, protozoacides, etc. In addition to the biocidally active ingredient, such germicidal compositions may also include without limitation finely divided dry or liquid diluents, extenders, fillers, conditioners, including various clays, phosphates, silicates, diatomaceous earth, talc, alumina-silica materials, liquid extenders, solvents, diluents or the like, including water and various organic liquids such as chlorinated benzenes, acetone, cyclohexanone, xylenes, chlorinated xylene, carbon disulfide, carbon tetrachloride, ethylene dichloride, and various mixtures thereof.

The present process is more particularly described in the following examples which are intended as illustrative only since numerous modifications and variations therein will be apparent to those skilled in the art.

EXAMPLE 1

Organic demand-free buffered water containing $2 \times 10^6$ cells per milliliter of the organism Legionella pneumophila was diluted with an equal part of an aqueous solution of 3-chloro-4,4-dimethyl-2-oxazolidinone (Compound A) so that the final concentration of the Legionella pneumophila cells in the test medium was $1 \times 10^6$ cells per milliliter and the concentration of positive chlorine from the 2-oxazolidinone was 1 milligram per liter. Similar test solutions were prepared with total positive chlorine concentrations from 3-chloro-4,4-dimethyl-2-oxazolidinone of 2, 5, 10, and 20 milligrams per liter. Aliquots were withdrawn at various times from each of the test solutions, the aliquots quenched with sodium thiosulfate, and diluted and applied to the surface of a Petri dish containing a growth medium for Legionella pneumophila, thereby to determine the presence, viability and number of the surviving organisms. Organic demand-free water (DFW) was prepared by treating distilled, deionized water with chlorine and sunlight to remove any organic load present in the water. For comparison, similar test solutions were prepared using calcium hypochlorite (Compound B) as a source of chlorine. The experiments were conducted at pH 7.0 and 9.5 and at three temperatures. A 0.05 molar phosphate buffer and a 0.01 molar borate/sodium hydroxide buffer were used respectively to maintain the test mediums at the pHs of 7.0 and 9.5. Results and conditions are tabulated in Table I.

EXAMPLE 2

The procedure of Example 1 was repeated at a pH of 9.5 and at 4° C. for both Compound A and Compound B except that a synthetic organic demand water (SDW) was used as the test medium. This synthetic organic demand water was prepared by mixing the following reagents with organic demand-free water: 375 milligrams per liter of each of the inorganic salts, calcium chloride, magnesium chloride, potassium chloride and sodium chloride; 50 milligrams per liter of bentonite clay; 30 milligrams per liter of humic acid; 0.01 percent final concentration of heat-treated horse serum and $5 \times 10^5$ cells per milliliter of heat-killed Saccharomyces cerevisiae. Results are tabulated in Table II.

TABLE I

| TIME TO EFFECT 99.99% KILL OF LEGIONELLA PNEUMOPHILA IN DFW | | | | | | | |
|---|---|---|---|---|---|---|---|
| | | | Concentration, ppm ($Cl^+$) | | | | |
| Compound | pH | Temp, °C. | 20 | 10 | 5 | 2 | 1 |
| A | 7.0 | 4 | 2 mins. | 5 mins. | 30 mins. | 30 mins. | 30 mins. |
| A | 7.0 | 22 | 2 mins. | 5 mins. | 30 mins. | 30 mins. | 30 mins. |
| A | 7.0 | 37 | 2 mins. | 5 mins. | 10 mins. | 30 mins. | 30 mins. |

TABLE I-continued

TIME TO EFFECT 99.99% KILL OF LEGIONELLA PNEUMOPHILA IN DFW

| Compound | pH | Temp, °C. | Concentration, ppm (Cl+) | | | | |
|---|---|---|---|---|---|---|---|
| | | | 20 | 10 | 5 | 2 | 1 |
| A | 9.5 | 37 | 1 min. | 1 min. | 10 mins. | 30 mins. | 30 mins. |
| A | 9.5 | 22 | 1 min. | 2 mins. | 10 mins. | 10 mins. | 30 mins. |
| A | 9.5 | 4 | 2 mins. | 5 mins. | 10 mins. | 30 mins. | 30 mins. |
| B | 9.5 | 4 | 1 min. | 1 min. | 1 min. | 1 min. | 1 min. |

TABLE II

TIME TO EFFECT 99.99% KILL OF LEGIONELLA PNEUMOPHILA IN SDW

| Compound | pH | Temp, °C. | Concentration, ppm (Cl+) | | | | |
|---|---|---|---|---|---|---|---|
| | | | 20 | 10 | 5 | 2 | 1 |
| A | 9.5 | 4 | 2 mins. | 10 mins. | 10 mins. | 30 mins. | 30 mins. |
| B | 9.5 | 4 | 1 min. | 2 mins. | 2 mins. | 5 mins. | 5 mins. |

The data in Tables I and II show that free chlorine available from calcium hypochlorite kills *Legionella pneumophila* faster than does the 2-oxazolidinone compound tested but that the 2-oxazolidinone kills the organism effectively even at 1 part per million (1 milligram per liter) total positive chlorine in 30 minutes at all temperatures studied. The greater stability of the 2-oxazolidinone compound compared to calcium hypochlorite results in the availability of a biocidal amount of chlorine for bactericidal action against *Legionella pneumophila* over a prolonged period of time, thus reducing the frequency of treatment required. The greater stability of 3-chloro-4,4-dimethyl-2-oxazolidinone, vis-a-vis calcium hypochlorite, has been reported. See, for example, "The Stability in Water of a New Chloramine Disinfectant as a Function of pH, Temperature, and Water Quality", by S. D. Worley et al, Water Resources Bulletin, Vol. 20, No. 3, pp. 365–368, June 1984. Since excessive speed is not a critical factor for disinfection of recirculating aqueous medium in an air-cooling system, the 2-oxazolidinone compounds should be economically attractive for use in that application, particularly in light of the greater corrosivity of calcium hypochlorite and elemental chlorine to materials of construction in air cooling system than 3-chloro-4,4-dimethyl-2-oxazolidinone.

Although the present process has been described with reference to specific details of certain embodiments thereof, it is not intended that such detail should be regarded as limitations upon the scope of the invention except as and to the extent that they are included in the accompanying claims.

We claim:

1. A method for controlling the growth of the microorganism *Legionella pneumophila* in a recirculating aqueous medium in an air-cooling system, which comprises adding to said recirculating aqueous medium a bactericidal amount of a 3-chloro-2-oxazolidinone represented by the graphic formula:

$$\begin{array}{c} H \quad H \\ R_1 \diagdown \!\! \diagup \\ \phantom{R_1} C - O \\ \diagup \phantom{C} \diagdown \\ C \phantom{XXX} C=O \\ \diagup \phantom{XX} \diagdown \diagup \\ R_2 \phantom{XXXX} N \\ \phantom{XXXXXX} | \\ \phantom{XXXXXX} Cl \end{array}$$

wherein $R_1$ is a $C_1$–$C_4$ alkyl, and $R_2$ is selected from the group consisting of $C_1$–$C_4$ alkyl, hydroxy, hydroxymethyl, $C_1$–$C_4$ alkoxy and —Ph—R, wherein Ph is phenylene and R is selected from the group $C_1$–$C_4$ alkyl, $C_1$–$C_4$ alkoxy and hydroxy.

2. The method of claim 1 wherein the 3-chloro-2-oxazolidinone compound is a 3-chloro-4,4-di($C_1$–$C_4$)alkyl-2-oxazolidinone.

3. The method of claim 2 wherein sufficient of the 2-oxazolidinone is added to the aqueous medium to establish a concentration of from about 0.3 to about 20 parts per million of potential positive chlorine.

4. The method of claim 1 wherein the oxazolidinone compound is 3-chloro-4,4-dimethyl-2-oxazolidinone.

5. The method of claim 4 wherein sufficient of 3-chloro-4,4-dimethyl-2-oxazolidinone is added to establish a concentration of from about 0.5 to 5 parts of potential positive chlorine in the aqueous medium.

6. The method of claim 1 wherein sufficient of the 2-oxazolidinone is added to the aqueous medium to establish a concentration of from about 0.3 to about 20 parts per million of potential positive chlorine.

7. A method of disinfecting recirculating water utilized in a closed cycle air-cooling system that is contaminated with *Legionella pneumophila* which comprises adding to said recirculating water a bactericidal amount of a 3-chloro-2-oxazolidinone represented by the graphic formula:

$$\begin{array}{c} H \quad H \\ R_1 \diagdown \!\! \diagup \\ \phantom{R_1} C - O \\ \diagup \phantom{C} \diagdown \\ C \phantom{XXX} C=O \\ \diagup \phantom{XX} \diagdown \diagup \\ R_2 \phantom{XXXX} N \\ \phantom{XXXXXX} | \\ \phantom{XXXXXX} Cl \end{array}$$

wherein $R_1$ is a $C_1$–$C_4$ alkyl, and $R_2$ is selected from the group consisting of $C_1$–$C_4$ alkyl, hydroxy, hydroxymethyl, $C_1$–$C_4$ alkoxy and —Ph—R, wherein Ph is phenylene and R is selected from the group $C_1$–$C_4$ alkyl, $C_1$–$C_4$ alkoxy and hydroxy.

8. The method of claim 7 wherein the 3-chloro-2-oxazolidinone compound is a 3-chloro-4,4-di($C_1$–$C_4$)alkyl-2-oxazolidinone.

9. The method of claim 8 wherein the 2-oxazolidinone is 3-chloro-4,4-dimethyl-2-oxazolidinone.

10. The method of claim 9 wherein sufficient of the 2-oxazolidinone is added to the water to establish therein a concentration of from about 0.3 to 20 parts per million of potential positive chlorine.

11. The method of claim 7 wherein sufficient of the 2-oxazolidinone is added to the water to establish therein a concentration of from about 0.3 to 20 parts per million of potential positive chlorine.

12. A method for treating an aqueous medium containing *Legionella pneumophila* which comprises adding to said aqueous medium sufficient of a 3-chloro-2-oxazolidinone represented by the graphic formula:

$$\begin{array}{c} \text{H} \quad \text{H} \\ R_1 \diagdown \overset{|}{C} - O \\ \diagdown C \diagup \quad \diagdown C = O \\ R_2 \diagup \quad \overset{|}{N} \\ \quad \overset{|}{Cl} \end{array}$$

wherein $R_1$ is a $C_1$–$C_4$ alkyl, and $R_2$ is selected from the group consisting of $C_1$–$C_4$ alkyl, hydroxy, hydroxymethyl, $C_1$–$C_4$ alkoxy and —Ph—R, wherein Ph is phenylene and R is selected from the group $C_1$–$C_4$ alkyl, $C_1$–$C_4$ alkoxy and hydroxy to establish therein a concentration of from about 0.3 to 20 parts per million of potential positive chlorine.

13. The method of claim 12 wherein the 3-chloro-2-oxazolidinone compound is a 3-chloro-4,4-di($C_1$–$C_4$)alkyl-2-oxazolidinone.

14. The method of claim 13 wherein the 3-chloro-2-oxazolidinone is 3-chloro-4,4-dimethyl-2-oxazolidinone.

15. A method of disinfecting a surface contaminated with *Legionella pneumophila*, which comprises applying to said surface a biocidally effective amount of 3-chloro-4,4-dimethyl-2-oxazolidinone.

16. The method of claim 15 wherein sufficient of the 2-oxazolidinone is applied to the surface to provide thereon a concentration of from about 0.3 to about 20 parts per million of potential positive chlorine.

* * * * *